(12) United States Patent
Chen et al.

(10) Patent No.: US 9,871,476 B2
(45) Date of Patent: Jan. 16, 2018

(54) BRAKING TORQUE CLOSED-LOOP CONTROL SYSTEM AND METHOD FOR SWITCH RELUCTANCE MOTOR

(71) Applicant: China University of Mining and Technology, Xuzhou, Jiangsu (CN)

(72) Inventors: Hao Chen, Jiangsu (CN); He Cheng, Jiangsu (CN); Zhou Yang, Jiangsu (CN); Qing Wang, Jiangsu (CN); Qianlong Wang, Jiangsu (CN); Xing Wang, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 0 days.

(21) Appl. No.: 15/521,799

(22) PCT Filed: Nov. 30, 2015

(86) PCT No.: PCT/CN2015/095906
§ 371 (c)(1),
(2) Date: Apr. 25, 2017

(87) PCT Pub. No.: WO2016/095695
PCT Pub. Date: Jun. 23, 2016

(65) Prior Publication Data
US 2017/0250635 A1  Aug. 31, 2017

(30) Foreign Application Priority Data

Dec. 15, 2014 (CN) .......................... 2014 1 0773037

(51) Int. Cl.
*H02P 25/08* (2016.01)
*H02P 6/24* (2006.01)
(Continued)

(52) U.S. Cl.
CPC .............. *H02P 6/24* (2013.01); *G05B 19/416* (2013.01); *H02P 21/20* (2016.02); *H02P 21/36* (2016.02);
(Continued)

(58) Field of Classification Search
USPC ........................................... 318/254.1, 254.2
See application file for complete search history.

(56) References Cited

U.S. PATENT DOCUMENTS 4,707,650 A    11/1987  Bose
2003/0020431 A1*  1/2003  Kiuchi ................. D06F 37/304
                                           318/779
(Continued)

FOREIGN PATENT DOCUMENTS

CN        201039063 Y  *  3/2008
CN        101534086 A     9/2009
(Continued)

*Primary Examiner* — Jorge L Carrasquillo
(74) *Attorney, Agent, or Firm* — Christensen, Fonder, Dardi & Herbert PLLC

(57) ABSTRACT

A braking torque closed-loop control system and method for a switch reluctance motor. The closed-loop control system comprises a torque regulator, a mode selector, a current regulator, an angle optimization controller and a torque estimator. On the basis of the rotating speed of the motor, the mode selector implements a phase current soft chopper control in a low rotating speed region and an angle position control in a high rotating speed region. The current regulator performs soft chopper hysteretic current regulation. The angle optimization controller optimizes a turn-on angle and a turn-off angle of a power converter master switch to reduce torque pulsation and improve braking energy feedback efficiency. The torque estimator conducts an on-line estimation of an actual braking torque estimated value of the motor (Continued)

based on an actual phase voltage and current of the motor to achieve braking torque signal feedback.

10 Claims, 2 Drawing Sheets

(51) Int. Cl.
    *G05B 19/416*     (2006.01)
    *H02P 25/086*     (2016.01)
    *H02P 21/36*     (2016.01)
    *H02P 21/20*     (2016.01)

(52) U.S. Cl.
    CPC ............ *H02P 25/08* (2013.01); *H02P 25/086* (2013.01); *G05B 2219/37312* (2013.01)

(56) References Cited

U.S. PATENT DOCUMENTS

| | | | | |
|---|---|---|---|---|
| 2004/0062062 A1* | 4/2004 | Lee | ........................ | H02M 7/797 |
| | | | | 363/37 |
| 2012/0104986 A1* | 5/2012 | Ahn | .................... | H02P 23/0086 |
| | | | | 318/701 |
| 2012/0169267 A1* | 7/2012 | Nashiki | ................ | H02K 19/103 |
| | | | | 318/701 |

FOREIGN PATENT DOCUMENTS

| | | |
|---|---|---|
| CN | 103187907 A | 7/2013 |
| CN | 104467568 A | 3/2015 |

* cited by examiner

BRAKING TORQUE CLOSED-LOOP CONTROL SYSTEM AND METHOD FOR SWITCH RELUCTANCE MOTOR

PRIORITY CLAIM

The present application is a National Phase entry of PCT Application No. PCT/CN2015/095906, filed Nov. 30, 2015, which claims priority to Chinese Patent Application No. 201410773037.8, filed Dec. 15, 2014, the disclosures of which are hereby incorporated by reference herein in their entirety.

FIELD OF THE INVENTION

The present invention relates to a motor braking closed-loop control system and method, particularly to a switched reluctance motor braking torque closed-loop control system and method.

BACKGROUND OF THE INVENTION

Switched reluctance motor system has a firm and durable structure, large starting torque and small starting current. It has high system efficiency and strong fault tolerance in a wide working area of rotational speed and torque and thus is one of the ideal motor drive systems for electric vehicles. Switched reluctance motor system works conveniently in four quadrants. By pushing power converter master switch turn-on angle and turn-off angle backwards, motor phase current mainly appears in the falling edge of phase inductance, current generates braking torque, and meanwhile the mechanical energy of the motor and load is converted into electric energy and fed back to the power source to realize regenerating braking control. Switched reluctance motor system is applied in the drive of electric vehicles. In order to raise the dynamic performance of acceleration and deceleration of vehicles, the braking torque commands given by the master control must be tracked in real time. In raising the braking response speed of switched reluctance motor drive systems, the braking torque closed-loop control is one of the technical difficulties of current switched reluctance motor systems.

SUMMARY OF THE INVENTION

The object of the present invention is to provide a switched reluctance motor braking torque closed-loop control system and method. The closed-loop control system and method feature low switching frequency, small switching loss, high response speed, high control accuracy, small pulsation of braking torque and high energy feedback efficiency.

The object of the present invention is realized in the following way: the present invention includes: a closed-loop control system and control method;

This closed-loop control system comprises: a low-speed torque regulator, a high-speed torque regulator, a mode selector, a current regulator, a first angle optimization controller, a second angle optimization controller and a torque estimator; the output end of the mode selector is connected to the input ends of the low-speed torque regulator and the high-speed torque regulator respectively, the output ends of the low-speed torque regulator and the high-speed torque regulator are connected to the input ends of the current regulator and the second angle optimization controller respectively, the output ends of the current regulator and the second angle optimization controller are connected to the switched reluctance motor through an asymmetric half-bridge power converter, and the actual phase current i(t) signal of switched reluctance motor is connected to the input ends of the current regulator and the torque estimator respectively; the actual phase voltage u(t) signal of switched reluctance motor is connected to the input end of the torque estimator, and the output end of the torque estimator is fed back to the input end of the mode selector; the output end of the first angle optimization controller is connected to the input end of the current regulator, and the rotor position signals P, Q and R of switched reluctance motor are connected to the input ends of the current regulator, the second angle optimization controller and the mode selector respectively.

The low-speed torque regulator comprises a feedforward element and a PI regulator, the given braking torque value $T_{ref}$ is connected to a feedback element through the feedforward element, torque error value $\epsilon_T$ is connected to the feedback element through the PI regulator, and the output of the feedback element is the given phase current value $i_{ref}$.

The torque estimator comprises a flux linkage integrator, a magnetic co-energy integrator, a sampling holder, a zero crossing detector, a first multiplier and a second multiplier, the first multiplier is connected to the input end of the flux linkage integrator through the feedback element, the output end of the flux linkage integrator is connected to the input end of the sampling holder through the magnetic co-energy integrator, the output end of the sampling holder is connected to the input end of the second multiplier, and the output end of the second multiplier outputs the estimated value $T_{est}$ of actual braking torque; the actual phase current i(t) signal is simultaneously connected to the input ends of the first multiplier, the magnetic co-energy integrator and the zero crossing detector, and the output end of the zero crossing detector is connected to the input ends of the flux linkage integrator, the magnetic co-energy integrator and the sampling holder respectively.

The current regulator comprises a hysteresis controller, a single-trigger comparator and two triple input AND gates, the actual phase current i(t) signal is simultaneously connected to the hysteresis controller and an input end of the single-trigger comparator, the given phase current value $i_{ref}$ signal is simultaneously connected to the hysteresis controller and another input end of the single-trigger comparator, and the output end of the hysteresis controller is connected to an input end of an AND gate; the output end of the single-trigger comparator is connected to an input end of the other AND gate; the output end of the first angle optimization controller is connected to an input end of the two AND gates, rotor position signals P, Q and R are connected to an input end of each of the two AND gates and an input end of the single-trigger comparator respectively, the output end of an AND gate outputs $Q_1$, $Q_3$ or $Q_5$ signal, and the output end of the other AND gate outputs $Q_2$, $Q_4$ or $Q_6$ signal.

The closed-loop control method: a low-speed torque regulator and a high-speed torque regulator are adopted to realize braking torque closed-loop control, the mode selector according to the speed of switched reluctance motor selects a low-speed torque regulator, a current regulator and a first angle optimization controller in the low speed zone of switched reluctance motor to realize phase current soft chopper control and selects a high-speed torque regulator and a second angle optimization controller in the high speed zone to realize angle position control, the first angle optimization controller and the second angle optimization controller optimize power converter master switch turn-on angle and turn-off angle to reduce torque pulsation and raise braking energy feedback efficiency, the torque estimator estimates online the estimated value $T_{est}$ of actual braking torque of switched reluctance motor based on the actual phase voltage u(t) and the actual phase current i(t) and realizes feedback of braking torque signals, and the actual braking torque tracks the given braking torque; in the low speed zone, the low-speed torque regulator outputs the given phase current value $i_{ref}$ based on the given braking torque value $T_{ref}$, and the torque error value $\epsilon_T$ between the given braking torque value $T_{ref}$ and the estimated value $T_{est}$ of the actual braking torque outputted by the torque estimator, and the current regulator outputs soft chopper signals based on the current error value $\epsilon_i$ between the given phase current value $i_{ref}$ and the actual phase current value i(t), outputs power converter master switch control signals Q1, . . . , Q6 in the light of power converter master switch turn-on angle $\theta_{on}$ signal, turn-off angle $\theta_{off}$ signal and current rotor position signals P, Q, R outputted by the first angle optimization controller, and controls power converter master switch turn-on and turn-off; in the high speed zone, the high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator, outputs power converter master switch control signals Q1, . . . , Q6 through optimization of the second angle optimization controller, controls power converter master switch turn-on and turn-off, and realizes switched reluctance motor braking torque closed-loop control.

The concrete process of the method is as follows:

The feedforward element of the low-speed torque regulator directly outputs feedforward current value $i_f$ based on the given braking torque value $T_{ref}$, the torque error value $\epsilon_T$ between the given braking torque value $T_{ref}$ and the estimated value $T_{est}$ of the actual braking torque outputted by the torque estimator is inputted to the PI regulator, the PI regulator outputs saturated error compensation current value $i_c$, the sum of feedforward current value $i_f$ and saturated error compensation current value $i_c$ constitute the given phase current value $i_{ref}$ of the current regulator, and the relation between the given braking torque value $T_{ref}$ and feedforward current value $i_f$ is shown in the formula below:

$$i_f = \sqrt{2T_{ref}/k_L} \quad (1)$$

wherein, $k_L$, is motor phase inductance slope.

The high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator.

The torque estimator utilizes the torque estimator to realize online estimation of the actual braking torque, the actual phase voltage u(t) of the motor minus actual phase current i(t) times phase resistance R gets flux linkage $\psi$(t)-time t derivative $$\frac{d\psi(t)}{dt}$$

as the input of the flux linkage integrator, the output of the flux linkage integrator is flux linkage $\psi$(t) as one of the two inputs of the magnetic co-energy integrator, the actual phase current i(t) is the other input of the magnetic co-energy integrator, the output of the magnetic co-energy integrator is magnetic co-energy $W_m'$(t) as an input of the sampling holder, the output of the sampling holder is the variation of magnetic co-energy $\Delta W_m'$, the zero crossing detector sends reset signal Reset and meanwhile sends trigger signal Trigger to the flux linkage integrator and the magnetic co-energy integrator when it detects the actual phase current i(t) is zero, the sampling holder outputs variation of magnetic co-energy $\Delta W_m'$ at the moment when the current electrical cycle ends in respect to sampling, and the second multiplier multiplies variation of magnetic co-energy $\Delta W_m'$ with $mN_r/2\pi$ to get estimated value $T_{est}$ of the actual braking torque of switched reluctance motor, where m is motor phase number, and $N_r$ is number of poles of motor rotor.

According to the speed of switched reluctance motor, the mode selector selects the current regulator and the first angle optimization controller in the low speed zone of switched reluctance motor to realize phase current soft chopper control, and selects the second angle optimization controller in the high speed zone to realize angle position control.

The current regulator realizes soft chopper hysteresis current regulation, the hysteresis controller compares these two input signals, i.e. the actual phase current value i(t) and the given phase current value $i_{ref}$, the output signal $S_h$ and position signal P or Q or R of the hysteresis controller, and power converter master switch turn-on angle $\theta_{on}$ signal and turn-off angle $\theta_{off}$ signal outputted by the first angle optimization controller are used as control signals $Q_1$ or $Q_3$ or $Q_5$ of the upper transistor of power converter master switch after logic "AND", the single-trigger comparator compares these two input signals, i.e. the actual phase current i(t) and the given phase current value $i_{ref}$, the output signal $S_C$ and position signal P or Q or R of the single-trigger comparator and power converter master switch turn-on angle $\theta_{on}$ signal and turn-off angle $\theta_{off}$ signal outputted by the first angle optimization controller are used as control signal $Q_2$ or $Q_4$ or $Q_6$ of the lower transistor of power converter master switch after logic "AND", and the falling edge of position signal P or Q or R sends reset signal Reset to the single-trigger comparator.

The first angle optimization controller and the second angle optimization controller both adopt genetic algorithm and use match value function:

$$f(\tau, \eta) = w_\tau \frac{\tau}{\tau_{max}} + w_\eta \frac{\eta}{\eta_{max}} \quad (2)$$

$$w_\tau \geq 0, w_\eta \geq 0, w_\tau + w_\eta = 1 \quad (3)$$

To optimize power converter master switch turn-on angle $\theta_{on}$ and turn-off angle $\theta_{off}$ to smooth pulsation of braking torque and raise braking energy feedback efficiency. In the formula, braking torque smoothing factor $$\tau = \frac{T_{ave}}{T_{max} - T_{min}},$$

$T_{ave}$ is mean value of braking torque, $T_{max}$ is maximum value of transient braking torque, $T_{min}$ is minimum value of transient braking torque, $\tau_{max}$ is optimum $\tau$, $w_\tau$ is weight coefficient of braking torque smoothing factor $\tau$, braking energy feedback efficiency $$\eta = \frac{P_{Gen}}{P_{Mech}} = \frac{I_{Ch}U_{Bat}}{T_{ave}\omega},$$

$P_{Gen}$ is generated power of the motor system during braking, $P_{Mech}$ is input mechanical power of the motor system during braking, $I_{Ch}$ is output current of the motor system during braking, $U_{Bat}$ is output voltage of the motor system during braking, $\omega$ is angular velocity of the motor system during braking, $\eta_{max}$ is optimum feedback efficiency $\eta$, and $w\eta$ is weight coefficient of energy feedback efficiency $\eta$.

Initialize the parameters of genetic algorithm, set the ranges of power converter master switch turn-on angle $\theta_{on}$ and turn-off angle $\theta_{off}$, adopt 10-digit binary codes, set group size M=20, evolution termination generations of genetic algorithm G=100, and crossover probability $P_c$=0.60, and adopt adaptive mutation probability $P_m$=0.001–[1:1:M] *0.001/M; then initialize groups, calculate fitness function $f(\tau, \eta)$, judge whether the number of iterations of evolution is reached, continue genetic operations of selection, crossover and mutation to generate offspring, update parents and populations and continue optimization if the number of iterations of evolution is not reached; or output optimized power converter master switch turn-on angle $\theta_{on}$ signal and turn-off angle $\theta_{off}$ signal if the number of iterations of evolution is reached.

Beneficial effect: The adoption of the foregoing solution realizes braking torque closed-loop control of switched reluctance motor system with multiple phases and multiple topological structures, soft chopper current hysteresis control is adopted, the switching frequency of the power converter is low and the switching loss is small; online estimation of braking lags behind actual braking torque by only one electrical cycle, realizing fast feedback of actual braking torque; the torque regulator adopts a feedforward element to accelerate system response speed to dynamic braking torque, and meanwhile adopts a saturation compensation element to compensate the braking torque error arising from saturation of magnetic field of the motor and raise control accuracy of braking torque; genetic algorithm is adopted, power converter master switch turn-on angle and turn-off angle are optimized, the pulsation of braking torque is small and the braking energy feedback efficiency is high. This method has a desirable engineering application value.

DETAILED DESCRIPTION OF THE EMBODIMENTS

Figure 1:
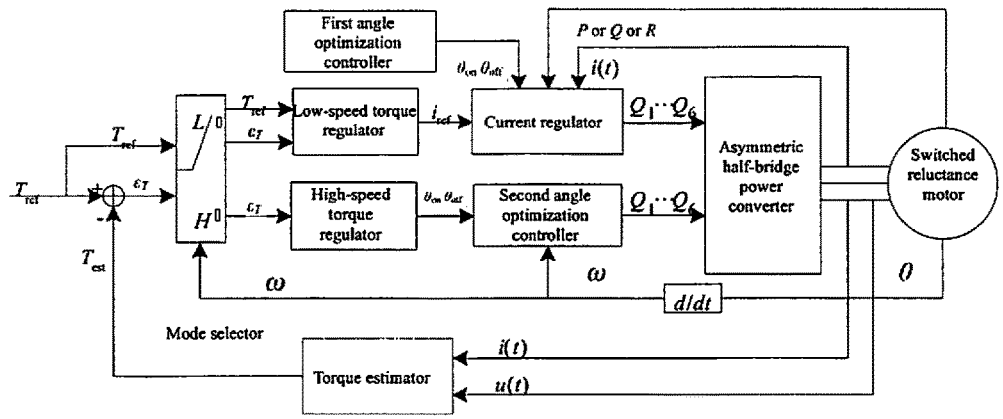
FIG. 1 is a structural diagram of a switched reluctance motor braking torque closed-loop control system according to the present invention.

The present invention includes: a closed-loop control system and control method;

This closed-loop control system comprises: a low-speed torque regulator, a high-speed torque regulator, a mode selector, a current regulator, a first angle optimization controller, a second angle optimization controller and a torque estimator; the output end of the mode selector is connected to the input ends of the low-speed torque regulator and the high-speed torque regulator respectively, the output ends of the low-speed torque regulator and the high-speed torque regulator are connected to the input ends of the current regulator and the second angle optimization controller respectively, the output ends of the current regulator and the second angle optimization controller are connected to the switched reluctance motor through an asymmetric half-bridge power converter, and the actual phase current i(t) signal of switched reluctance motor is connected to the input ends of the current regulator and the torque estimator respectively; the actual phase voltage u(t) signal of switched reluctance motor is connected to the input end of the torque estimator, and the output end of the torque estimator is fed back to the input end of the mode selector; the output end of the first angle optimization controller is connected to the input end of the current regulator, and the rotor position signals P, Q and R of switched reluctance motor are connected to the input ends of the current regulator, the second angle optimization controller and the mode selector respectively.

The low-speed torque regulator comprises a feedforward element and a PI regulator, the given brake torque value $T_{ref}$ is connected to a feedback element through the feedforward element, torque error value $\epsilon_T$ is connected to the feedback element through the PI regulator, and the output of the feedback element is the given phase current value $i_{ref}$.

The torque estimator comprises a flux linkage integrator, a magnetic co-energy integrator, a sampling holder, a zero crossing detector, a first multiplier and a second multiplier, the first multiplier is connected to the input end of the flux linkage integrator through a feedback element, the output end of the flux linkage integrator is connected to the input end of the sampling holder through the magnetic co-energy integrator, the output end of the sampling holder is connected to the input end of the second multiplier, and the output end of the second multiplier outputs the estimated value $T_{est}$ of the actual braking torque; the actual phase current i(t) signal is simultaneously connected to the input ends of the first multiplier, the magnetic co-energy integrator and the zero crossing detector, and the output end of the zero crossing detector is connected to the input ends of the flux linkage integrator, the magnetic co-energy integrator and the sampling holder respectively.

The current regulator comprises a hysteresis controller, a single-trigger comparator and two triple input AND gates, the actual phase current i(t) signal is simultaneously connected to the hysteresis controller and an input end of the single-trigger comparator, the given phase current value $i_{ref}$ signal is simultaneously connected to the hysteresis controller and another input end of the single-trigger comparator, and the output end of the hysteresis controller is connected to an input end of an AND gate; the output end of the single-trigger comparator is connected to an input end of the other AND gate; the output end of the first angle optimization controller is connected to an input end of the two AND gates, rotor position signals P, Q and R are connected to an input end of each of the two AND gates and an input end of the single-trigger comparator respectively, the output end of an AND gate outputs $Q_1$, $Q_3$ or $Q_5$ signal, and the output end of the other AND gate outputs $Q_2$, $Q_4$ or $Q_6$ signal.

The closed-loop control method: a low-speed torque regulator and a high-speed torque regulator are adopted to realize braking torque closed-loop control, the mode selector according to the speed of switched reluctance motor selects a low-speed torque regulator, a current regulator and a first angle optimization controller in the low speed zone of switched reluctance motor to realize phase current soft chopper control and selects a high-speed torque regulator and a second angle optimization controller in the high speed zone to realize angle position control, the first angle optimization controller and the second angle optimization controller optimize power converter master switch turn-on angle and turn-off angle to reduce torque pulsation and raise braking energy feedback efficiency, the torque estimator estimates online the estimated value $T_{est}$ of actual braking torque of switched reluctance motor based on the actual phase voltage u(t) and the actual phase current i(t) and realizes feedback of braking torque signals, and the actual braking torque tracks the given braking torque; in the low speed zone, the low-speed torque regulator outputs the given phase current value $i_{ref}$ based on the given braking torque value $T_{ref}$, and the torque error value $\epsilon_T$ between the given braking torque value $T_{ref}$ and the estimated value $T_{est}$ of the actual braking torque outputted by the torque estimator, and the current regulator outputs soft chopper signals based on the current error value $\epsilon_i$ between the given phase current value $i_{ref}$ and the actual phase current value i(t), outputs power converter master switch control signals Q1, . . . , Q6 in the light of power converter master switch turn-on angle $\theta_{on}$ signal, turn-off angle $\theta_{off}$ signal and current rotor position signals P, Q, R outputted by the first angle optimization controller, and controls power converter master switch turn-on and turn-off; in the high speed zone, high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator, outputs power converter master switch control signals Q1, . . . , Q6 through optimization of the second angle optimization controller, controls power converter master switch turn-on and turn-off, and realizes switched reluctance motor braking torque closed-loop control.

The concrete process of the method is as follows:

The feedforward element of the low-speed torque regulator directly outputs feedforward current value $i_f$ based on the given braking torque value $T_{ref}$, the torque error value $\epsilon_T$ between the given braking torque value $T_{ref}$ and the estimated value $T_{est}$ of the actual braking torque outputted by the torque estimator is inputted to the PI regulator, the PI regulator outputs saturated error compensation current value $i_c$, the sum of feedforward current value $i_f$ and saturated error compensation current value $i_c$ constitute the given phase current value $i_{ref}$ of the current regulator, and the relation between the given braking torque value $T_{ref}$ and feedforward current value $i_f$ is shown in the formula below:

$$i_f = \sqrt{2T_{ref}/k_L} \qquad (1)$$

wherein, $k_L$ is motor phase inductance slope.

The high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator.

The torque estimator utilizes the torque estimator to realize online estimation of the actual braking torque, the actual phase voltage u(t) of the motor minus actual phase current i(t) times phase resistance R gets flux linkage ψ(t)-time t derivative $$\frac{d\psi(t)}{dt}$$

as the input of the flux linkage integrator, the output of the flux linkage integrator is flux linkage ψ(t) as one of the two inputs of the magnetic co-energy integrator, the actual phase current i(t) is the other input of the magnetic co-energy integrator, the output of the magnetic co-energy integrator is magnetic co-energy $W_m'(t)$ as an input of the sampling holder, the output of the sampling holder is the variation of magnetic co-energy $\Delta W_m'$, the zero crossing detector sends reset signal Reset and meanwhile sends trigger signal Trigger to the flux linkage integrator and the magnetic co-energy integrator when it detects the actual phase current i(t) is zero, the sampling holder outputs variation of magnetic co-energy $\Delta W_m'$ at the moment when the current electrical cycle ends in respect to sampling, and the second multiplier multiplies variation of magnetic co-energy $\Delta W_m'$ with $mN_r/2\pi$ to get estimated value $T_{est}$ of the actual braking torque of switched reluctance motor, where m is motor phase number, and $N_r$ is number of poles of motor rotor.

According to the speed of switched reluctance motor, the mode selector selects the current regulator and the first angle optimization controller in the low speed zone of switched reluctance motor to realize phase current soft chopper control, and selects the second angle optimization controller in the high speed zone to realize angle position control.

The current regulator realizes soft chopper hysteresis current regulation, the hysteresis controller compares these two input signals, i.e. the actual phase current value i(t) and the given phase current value $i_{ref}$, the output signal $S_h$ and position signal P or Q or R of the hysteresis controller, and power converter master switch turn-on angle $\theta_{on}$ signal and turn-off angle $\theta_{off}$ signal outputted by the first angle optimization controller are used as control signals $Q_1$ or $Q_3$ or $Q_5$ of the upper transistor of power converter master switch after logic "AND", the single-trigger comparator compares these two input signals, i.e. the actual phase current i(t) and the given phase current value $i_{ref}$, the output signal $S_C$ and position signal P or Q or R of the single-trigger comparator and power converter master switch turn-on angle $\theta_{on}$ signal and turn-off angle $\theta_{off}$ signal outputted by the first angle optimization controller are used as control signal $Q_2$ or $Q_4$ or $Q_6$ of the lower transistor of power converter master switch after logic "AND", and the falling edge of position signal P or Q or R sends reset signal Reset to the single-trigger comparator.

The first angle optimization controller and the second angle optimization controller both adopt genetic algorithm and use match value function:

$$f(\tau, \eta) = w_\tau \frac{\tau}{\tau_{max}} + w_\eta \frac{\eta}{\eta_{max}} \qquad (2)$$

$$w_\tau \geq 0, w_\eta \geq 0, w_\tau + w_\eta = 1 \qquad (3)$$

To optimize power converter master switch turn-on angle $\theta_{on}$ and turn-off angle $\theta_{off}$ to smooth pulsation of braking torque and raise braking energy feedback efficiency. In the formula, braking torque smoothing factor $$\tau = \frac{T_{ave}}{T_{max} - T_{min}},$$

$T_{ave}$ is mean value of braking torque, $T_{max}$ is maximum value of transient braking torque, $T_{min}$ is minimum value of transient braking torque, $\tau_{max}$ is optimum $\tau$, $w_\tau$ is weight coefficient of braking torque smoothing factor $\tau$, braking energy feedback efficiency $$\eta = \frac{P_{Gen}}{P_{Mech}} = \frac{I_{Ch} U_{Bat}}{T_{ave} \omega},$$

$P_{Gen}$ is generated power of the motor system during braking, $P_{Mech}$ is input mechanical power of the motor system during braking, $I_{Ch}$ is output current of the motor system during braking, $U_{Bat}$ is output voltage of the motor system during braking, $\omega$ is angular velocity of the motor system during braking, $\eta_{max}$ is optimum feedback efficiency $\eta$, and $w\eta$ is weight coefficient of energy feedback efficiency $\eta$.

Initialize the parameters of genetic algorithm, set the ranges of power converter master switch turn-on angle $\theta_{on}$ and turn-off angle $\theta_{off}$, adopt 10-digit binary codes, set group size M=20, evolution termination generations of genetic algorithm G=100, and crossover probability $P_c$=0.60, and adopt adaptive mutation probability $P_m$=0.001-[1:1:M] *0.001/M; then initialize groups, calculate fitness function $f(\tau, \eta)$, judge whether the number of iterations of evolution is reached, continue genetic operations of selection, crossover and mutation to generate offspring, update parents and populations and continue optimization if the number of iterations of evolution is not reached; or output optimized power converter master switch turn-on angle $\theta_{on}$ signal and turn-off angle $\theta_{off}$ signal if the number of iterations of evolution is reached.

Below the embodiments of the present invention are further described by referring to accompanying drawings:

Embodiment 1

FIG. 1 shows a switched reluctance motor braking torque closed-loop control system, which is a system dedicated to closed-loop control method. This control system comprises a low-speed torque regulator, a high-speed torque regulator, a mode selector, a current regulator, a first angle optimization controller, a second angle optimization controller and a torque estimator.

The closed-loop control method: a low-speed torque regulator and a high-speed torque regulator are adopted to realize braking torque closed-loop control, the mode selector according to the speed of switched reluctance motor selects a low-speed torque regulator, a current regulator and a first angle optimization controller in the low speed zone of switched reluctance motor to realize phase current soft chopper control and selects a high-speed torque regulator and a second angle optimization controller in the high speed zone to realize angle position control, the first angle optimization controller and the second angle optimization controller optimize power converter master switch turn-on angle and turn-off angle to reduce torque pulsation and raise braking energy feedback efficiency, the torque estimator estimates online the estimated value $T_{est}$ of braking torque of switched reluctance motor based on the actual phase voltage u(t) and the actual phase current i(t) and realizes feedback of braking torque signals, and the actual braking torque tracks the given braking torque; in the low speed zone, the low-speed torque regulator outputs the given phase current value $i_{ref}$ based on the given braking torque value $T_{ref}$, and the torque error value $\epsilon_T$ between the given braking torque value $T_{ref}$ and the estimated value $T_{est}$ of the actual braking torque outputted by the torque estimator, and the current regulator outputs soft chopper signals based on the current error value $\epsilon_i$ between the given phase current value $i_{ref}$ and the actual phase current value i(t), outputs power converter master switch control signals Q1, ..., Q6 in the light of power converter master switch turn-on angle $\theta_{on}$ signal, turn-off angle $\theta_{off}$ signal and current rotor position signals P, Q, R outputted by the first angle optimization controller, and controls power converter master switch turn-on and turn-off; in the high speed zone, the high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual brake torquing outputted by the torque estimator, outputs power converter master switch control signals Q1, ..., Q6 through optimization of the second angle optimization controller, controls power converter master switch turn-on and turn-off, and realizes switched reluctance motor braking torque closed-loop control.

Figure 2:
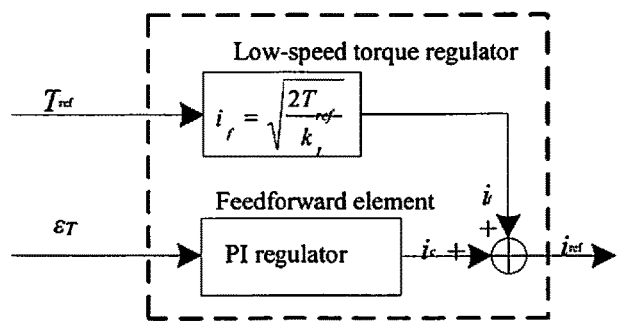
FIG. 2 is a structural diagram of a low-speed torque regulator according to the present invention.
Figure 3:
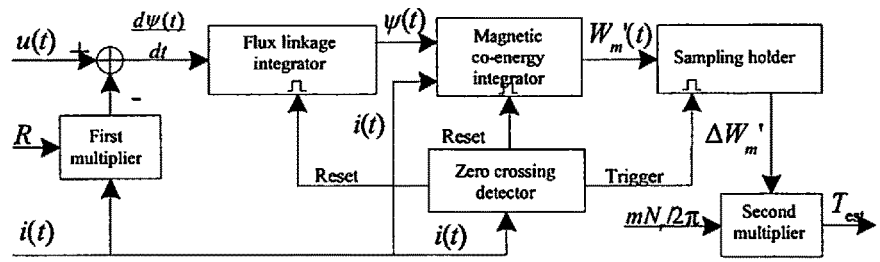
FIG. 3 is a structural diagram of a torque estimator according to the present invention.
Figure 4:
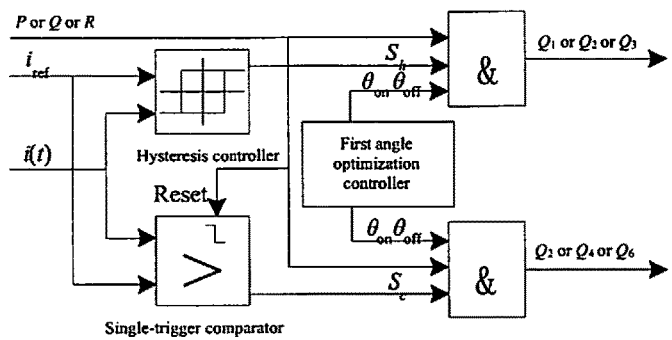
FIG. 4 is a structural diagram of a current regulator according to the present invention.

1) As shown in FIG. 2, the feedforward element of the low-speed torque regulator directly outputs feedforward current value $i_f$ based on the given braking torque value $T_{ref}$, the torque error value $\epsilon_T$ between the given braking torque value $T_{ref}$ and the estimated value $T_{est}$ of the actual braking torque outputted by the torque estimator is inputted to the PI regulator, the PI regulator outputs saturated error compensation current value $i_c$, the sum of feedforward current value $i_f$ and saturated error compensation current value $i_c$ constitute the given phase current value $i_{ref}$ of the current regulator, and the relation between the given braking torque value $T_{ref}$ and feedforward current value $i_f$ is shown in the formula below:

$$i_f = \sqrt{2T_{ref}/k_L} \qquad (1)$$

wherein, $k_L$ is motor phase inductance slope;

2) The high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator;

3) As shown in FIG. 3, the torque estimator realizes online estimation of the actual braking torque and comprises a flux linkage integrator, a magnetic co-energy integrator, a sampling holder, a zero crossing detector and a multiplier, the actual phase voltage u(t) of the motor minus actual phase current i(t) times phase resistance R gets flux linkage ψ(t)-time t derivative $$\frac{d\psi(t)}{dt}$$

as the input of the flux linkage integrator, the output of the flux linkage integrator is flux linkage v(t) as one of the two inputs of the magnetic co-energy integrator, the actual phase current i(t) is the other input of the magnetic co-energy integrator, the output of the magnetic co-energy integrator is magnetic co-energy $W_m'(t)$ as an input of the sampling holder, the output of the sampling holder is the variation of magnetic co-energy $\Delta W_m'$, the zero crossing detector sends reset signal Reset and meanwhile sends trigger signal Trigger to the flux linkage integrator and the magnetic co-energy integrator when it detects the actual phase current i(t) is zero, the sampling holder outputs variation of magnetic co-energy $\Delta W_m'$ at the moment when the current electrical cycle ends in respect to sampling, and the second multiplier multiplies variation of magnetic co-energy $\Delta W_m'$ with $mN_r/2\pi$ to get estimated value $T_{est}$ of the actual braking torque of switched reluctance motor, where m is motor phase number, and $N_r$ is number of poles of motor rotor;

4) The mode selector selects the current regulator and the first angle optimization controller in the low speed zone of switched reluctance motor to realize phase current soft chopper control, and selects the second angle optimization controller in the high speed zone to realize angle position control;

5) As shown in FIG. 4, the current regulator realizes soft chopper hysteresis current regulation, and comprises a hysteresis controller, a single-trigger comparator and two triple input AND gates, the hysteresis controller compares these two input signals, i.e. the actual phase current value i(t) and the given phase current value $i_{ref}$, the output signal $S_h$ and position signal P or Q or R of the hysteresis controller, and power converter master switch turn-on angle $\theta_{on}$ signal and turn-off angle $\theta_{off}$ signal outputted by the first angle optimization controller are used as control signals $Q_1$ or $Q_3$ or $Q_5$ of the upper transistor of power converter master switch after logic "AND", the single-trigger comparator compares these two input signals, i.e. the actual phase current i(t) and the given phase current value $i_{ref}$, the output signal $S_C$ and position signal P or Q or R of the single-trigger comparator and power converter master switch turn-on angle $\theta_{on}$ signal and turn-off angle $\theta_{off}$ signal outputted by the first angle optimization controller are used as control signal $Q_2$ or $Q_4$ or $Q_6$ of the lower transistor of power converter master switch after logic "AND", and the falling edge of position signal P or Q or R sends reset signal Reset to the single-trigger comparator;

6) The first angle optimization controller and the second angle optimization controller both adopt genetic algorithm and use match value function:

$$f(\tau, \eta) = w_\tau \frac{\tau}{\tau_{max}} + w_\eta \frac{\eta}{\eta_{max}} \quad (2)$$

$$w_\tau \geq 0, w_\eta \geq 0, w_\tau + w_\eta = 1 \quad (3)$$

To optimize power converter master switch turn-on angle $\theta_{on}$ and turn-off angle $\theta_{off}$ to smooth pulsation of braking torque and raise braking energy feedback efficiency. In the formula, braking torque smoothing factor $$\tau = \frac{T_{ave}}{T_{max} - T_{min}},$$

$T_{ave}$ is mean value of braking torque, $T_{max}$ is maximum value of transient braking torque, $T_{min}$ is minimum value of transient braking torque, $\tau_{max}$ is optimum $\tau$, $w_\tau$ is weight coefficient of braking torque smoothing factor $\tau$, braking energy feedback efficiency $$\eta = \frac{P_{Gen}}{P_{Mech}} = \frac{I_{Ch} U_{Bat}}{T_{ave}\omega},$$

Figure 5:
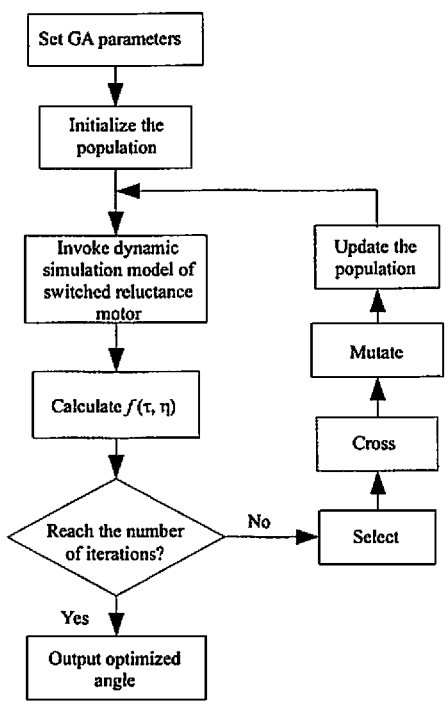
FIG. 5 is a schematic for the flow for optimizing power converter master switch turn-on angle and turn-off angle by genetic algorithm according to the present invention.

$P_{Gen}$ is generated power of the motor system during braking, $P_{Mech}$ is input mechanical power of the motor system during braking, $I_{Ch}$ is output current of the motor system during braking, $U_{Bat}$ is output voltage of the motor system during braking, w is angular velocity of the motor system during braking, $\eta_{max}$ is optimum feedback efficiency $\eta$, and $w_\eta$ is weight coefficient of energy feedback efficiency $\eta$;

7) As shown in FIG. 5, firstly initialize the parameters of genetic algorithm GA, set the ranges of power converter master switch turn-on angle $\theta_{on}$ and turn-off angle $\theta_{off}$ as [18°, 28°] and [30°, 40°] respectively, (0° and 45° are minimum inductance positions, and 22.5° is maximum inductance position), adopt 10-digit binary codes, set group size M=20, evolution termination generations of genetic algorithm G=100, and crossover probability $P_c$=0.60, and adopt adaptive mutation probability $P_m$=0.001−[1:1:M]*0.001/M; then initialize groups, invoke dynamic simulation model of switched reluctance motor, select $w_\tau$=0.3, $w_\eta$=0.7, calculate fitness function $f(\tau, \eta)$, judge whether the number of iterations of evolution is reached, continue genetic operations of selection, crossover and mutation to generate offspring, update parents and populations and continue optimization if the number of iterations of evolution is not reached; or output optimized power converter master switch turn-on angle $\theta_{on}$ signal and turn-off angle $\theta_{off}$ signal if the number of iterations of evolution is reached, and the optimized indexes are $\tau$=1.382, $\eta$=91.36%, thereby realizing smaller pulsation of braking torque and higher braking energy feedback efficiency.

The invention claimed is:

1. A switched reluctance motor braking torque closed-loop control system, comprising: a low-speed torque regulator, a high-speed torque regulator, a mode selector, a current regulator, a first angle optimization controller, a second angle optimization controller and a torque estimator; the output end of the mode selector is connected to the input ends of the low-speed torque regulator and the high-speed torque regulator respectively, the output ends of the low-speed torque regulator and the high-speed torque regulator are connected to the input ends of the current regulator and the second angle optimization controller respectively, the output ends of the current regulator and the second angle optimization controller are connected to switched reluctance motor through an asymmetric half-bridge power converter, and the actual phase current i(t) signal of switched reluctance motor is connected to the input ends of the current regulator and the torque estimator respectively; the actual phase voltage u(t) signal of switched reluctance motor is connected to the input end of the torque estimator, and the output end of the torque estimator is fed back to the input end of the mode selector; the output end of the first angle optimization controller is connected to the input end of the current regulator, and the rotor position signals P, Q and R of switched reluctance motor are connected to the input ends of the current regulator, the second angle optimization controller and the mode selector respectively.

2. The switched reluctance motor braking torque closed-loop control system according to claim 1, wherein the low-speed torque regulator comprises a feedforward element and a PI regulator, the given braking torque value $T_{ref}$ is connected to a feedback element through the feedforward element, torque error value $\epsilon_T$ is connected to the feedback element through the PI regulator, and the output of the feedback element is the given phase current value $i_{ref}$.

3. The switched reluctance motor braking torque closed-loop control system according to claim 1, wherein the torque estimator comprises a flux linkage integrator, a magnetic co-energy integrator, a sampling holder, a zero crossing detector, a first multiplier and a second multiplier, the first multiplier is connected to the input end of the flux linkage integrator through a feedback element, the output end of the flux linkage integrator is connected to the input end of the sampling holder through the magnetic co-energy integrator, the output end of the sampling holder is connected to the input end of the second multiplier, the output end of the second multiplier outputs the estimated value $T_{est}$ of actual braking torque; the actual phase current i(t) signal is simultaneously connected to the input ends of the first multiplier, the magnetic co-energy integrator and the zero crossing detector, and the output end of the zero crossing detector is connected to the input ends of the flux linkage integrator, the magnetic co-energy integrator and the sampling holder respectively.

4. The switched reluctance motor braking torque closed-loop control system according to claim 1, wherein the current regulator comprises a hysteresis controller, a single-trigger comparator and two triple input AND gates, the actual phase current i(t) signal is simultaneously connected to the hysteresis controller and an input end of the single-trigger comparator, the given phase current value $i_{ref}$ signal is simultaneously connected to the hysteresis controller and another input end of the single-trigger comparator, and the output end of the hysteresis controller is connected to an input end of an AND gate; the output end of the single-trigger comparator is connected to an input end of the other AND gate; the output end of the first angle optimization controller is connected to an input end of each of the two AND gates, rotor position signals P, Q and R are connected to an input end of each of the two AND gates and an input end of the single-trigger comparator respectively, the output end of an AND gate outputs $Q_1$, $Q_3$ or $Q_5$ signal, and the output end of the other AND gate outputs $Q_2$, $Q_4$ or $Q_6$ signal.

5. A method adopting the switched reluctance motor braking torque closed-loop control system according to claim 1, wherein a low-speed torque regulator and a high-speed torque regulator are adopted to realize braking torque closed-loop control, the mode selector according to the speed of switched reluctance motor selects a low-speed torque regulator, a current regulator and a first angle optimization controller in the low speed zone of switched reluctance motor to realize phase current soft chopper control and selects a high-speed torque regulator and a second angle optimization controller in the high speed zone to realize angle position control, the first angle optimization controller and the second angle optimization controller optimize power converter master switch turn-on angle and turn-off angle to reduce torque pulsation and raise braking energy feedback efficiency, the torque estimator estimates online the estimated value $T_{est}$ of braking torque of switched reluctance motor based on the actual phase voltage u(t) and the actual phase current i(t) and realizes feedback of braking torque signals, and the actual braking torque tracks the given braking torque; in the low speed zone, the low-speed torque regulator outputs the given phase current value $i_{ref}$ based on the given braking torque value $T_{ref}$, and the torque error value $\epsilon_T$ between the given braking torque value $T_{ref}$ and the estimated value $T_{est}$ of the actual braking torque outputted by the torque estimator, and the current regulator outputs soft chopper signals based on the current error value $\epsilon_i$ between the given phase current value $i_{ref}$ and the actual phase current value i(t), outputs power converter master switch control signals Q1, . . . , Q6 in the light of power converter master switch turn-on angle $\theta_{on}$ signal, turn-off angle $\theta_{off}$ signal and current rotor position signals P, Q, R outputted by the first angle optimization controller, and controls power converter master switch turn-on and turn-off; in the high speed zone, the high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator, outputs power converter master switch control signals Q1, . . . , Q6 through optimization of the second angle optimization controller, controls power converter master switch turn-on and turn-off, and realizes switched reluctance motor braking torque closed-loop control.

6. The method of the switched reluctance motor braking torque closed-loop control system according to claim 5, wherein the feedforward element of the low-speed torque regulator directly outputs feedforward current value $i_f$ based on the given braking torque value $T_{ref}$, the torque error value $\epsilon_T$ between the given braking torque value $T_{ref}$ and the estimated value $T_{est}$ of the actual braking torque outputted by the torque estimator is inputted to the PI regulator, the PI regulator outputs saturated error compensation current value $i_c$, the sum of feedforward current value $i_f$ and saturated error compensation current value $i_c$ constitute the given phase current value $i_{ref}$ of the current regulator, and the relation between the given braking torque value $T_{ref}$ and feedforward current value $i_f$ is shown in the formula below:

$$i_f = \sqrt{2T_{ref}/k_L} \qquad (1)$$

wherein, $k_L$ is motor phase inductance slope.

7. The method of the switched reluctance motor braking torque closed-loop control system according to claim 5, wherein the high-speed torque regulator outputs power converter master switch turn-on angle $\theta_{on}$ signal and turn-off angle $\theta_{off}$ signal based on the torque error value $\epsilon_T$ between the given braking torque value $T_{ref}$ and the estimated value $T_{est}$ of the actual braking torque outputted by the torque estimator.

8. The method of the switched reluctance motor braking torque closed-loop control system according to claim 5, wherein the torque estimator utilizes the torque estimator to realize online estimation of the actual braking torque, the actual phase voltage u(t) of the motor minus actual phase current i(t) times phase resistance R gets flux linkage $\psi$(t)-time t derivative $$\frac{d\psi(t)}{dt}$$

as the input of the flux linkage integrator, the output of the flux linkage integrator is flux linkage $\psi$(t) as one of the two inputs of the magnetic co-energy integrator, the actual phase current i(t) is the other input of the magnetic co-energy integrator, the output of the magnetic co-energy integrator is magnetic co-energy $W_m'$(t) as an input of the sampling holder, the output of the sampling holder is the variation of magnetic co-energy $\Delta W_m'$, the zero crossing detector sends reset signal Reset and meanwhile sends trigger signal Trigger to the flux linkage integrator and the magnetic co-energy integrator when it detects the actual phase current i(t) is zero, the sampling holder outputs variation of magnetic co-energy $\Delta W_m'$ at the moment when the current electrical cycle ends in respect to sampling, and the second multiplier multiplies variation of magnetic co-energy $\Delta W_m'$ with $mN_r/2\pi$ to get estimated value $T_{est}$ of the actual braking torque of switched reluctance motor, where m is motor phase number, and $N_r$ is number of poles of motor rotor.

9. The method of the switched reluctance motor braking torque closed-loop control system according to claim 5, wherein the mode selector according to the speed of switched reluctance motor selects the current regulator and the first angle optimization controller in the low speed zone of switched reluctance motor to realize phase current soft chopper control, and selects the second angle optimization controller in the high speed zone to realize angle position control.

10. The method of the switched reluctance motor braking torque closed-loop control system according to claim 5, wherein the current regulator realizes soft chopper hysteresis current regulation, the hysteresis controller compares the actual phase current value i(t) and the given phase current value $i_{ref}$, these two input signals, the output signal $S_h$ and position signal P or Q or R of the hysteresis controller, and power converter master switch turn-on angle $\theta_{on}$ signal and turn-off angle $\theta_{off}$ signal outputted by the first angle optimization controller are used as control signals $Q_1$ or $Q_3$ or $Q_5$ of the upper transistor of power converter master switch after logic "AND", the single-trigger comparator compares the actual phase current i(t) and the given phase current value $i_{ref}$, these two input signals, the output signal $S_C$ and position signal P or Q or R of the single-trigger comparator and power converter master switch turn-on angle $\theta_{on}$ signal and turn-off angle $\theta_{off}$ signal outputted by the first angle optimization controller are used as control signal $Q_2$ or $Q_4$ or $Q_6$ of the lower transistor of power converter master switch after logic "AND", and the falling edge of position signal P or Q or R sends reset signal Reset to the single-trigger comparator;

the first angle optimization controller and the second angle optimization controller both adopt genetic algorithm and use match value function:

$$f(\tau, \eta) = w_\tau \frac{\tau}{\tau_{max}} + w_\eta \frac{\eta}{\eta_{max}} \quad (2)$$

$$w_\tau \geq 0, w_\eta \geq 0, w_\tau + w_\eta = 1 \quad (3)$$

to optimize power converter master switch turn-on angle $\theta_{on}$ and turn-off angle $\theta_{off}$ to smooth pulsation of braking torque and raise braking energy feedback efficiency, in the formula, braking torque smoothing factor $$\tau = \frac{T_{ave}}{T_{max} - T_{min}},$$

$T_{ave}$ is mean value of braking torque, $T_{max}$ is maximum value of transient braking torque, $T_{min}$ is minimum value of transient braking torque, $\tau_{max}$ is optimum $\tau$, $w_\tau$ is weight coefficient of braking torque smoothing factor r, braking energy feedback efficiency $$\eta = \frac{P_{Gen}}{P_{Mech}} = \frac{I_{Ch}U_{Bat}}{T_{ave}\omega},$$

$P_{Gen}$ is generated power of the motor system during braking, $P_{Mech}$ is input mechanical power of the motor system during braking, $I_{Ch}$ is output current of the motor system during braking, $U_{Bat}$ is output voltage of the motor system during braking, $\omega$ is angular velocity of the motor system during braking, $\eta_{max}$ is optimum feedback efficiency $\eta$, and $w_\eta$ is weight coefficient of energy feedback efficiency $\eta$;

initialize the parameters of genetic algorithm, set the ranges of power converter master switch turn-on angle $\theta_{on}$ and turn-off angle $\theta_{off}$, adopt 10-digit binary codes, set group size M=20, evolution termination generations of genetic algorithm G=100, and crossover probability $P_c$=0.60, and adopt adaptive mutation probability $P_m$=0.001−[1:1:M]*0.001/M; then initialize groups, calculate fitness function $f(\tau, \eta)$, judge whether the number of iterations of evolution is reached, continue genetic operations of selection, crossover and mutation to generate offspring, update parents and populations and continue optimization if the number of iterations of evolution is not reached; or output optimized power converter master switch turn-on angle $\theta_{on}$ signal and turn-off angle $\theta_{off}$ signal if the number of iterations of evolution is reached.

* * * * *